(12) United States Patent
Huang et al.

(10) Patent No.: US 10,192,039 B2
(45) Date of Patent: *Jan. 29, 2019

(54) SYSTEM FOR CONTEXT-BASED DATA PROTECTION

(71) Applicant: Microsoft Technology Licensing, LLC, Redmond, WA (US)

(72) Inventors: Jerry Huang, Redmond, WA (US); Zhen Liu, Tarrytown, NY (US); QingHu Li, Beijing (CN); Howard Liu, Beijing (CN)

(73) Assignee: Microsoft Technology Licensing, LLC, Redmond, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 14/402,280

(22) PCT Filed: Jun. 27, 2014

(86) PCT No.: PCT/CN2014/080948
§ 371 (c)(1),
(2) Date: Nov. 19, 2014

(87) PCT Pub. No.: WO2015/196451
PCT Pub. Date: Dec. 30, 2015

(65) Prior Publication Data
US 2016/0283698 A1 Sep. 29, 2016

(51) Int. Cl.
*G06F 7/04* (2006.01)
*G06F 21/10* (2013.01)
(Continued)

(52) U.S. Cl.
CPC ............. *G06F 21/10* (2013.01); *G06F 3/015* (2013.01); *G06F 3/0482* (2013.01);
(Continued)

(58) Field of Classification Search
USPC .......................................................... 726/26
See application file for complete search history.

(56) References Cited

U.S. PATENT DOCUMENTS 6,480,096 B1   11/2002   Gutman et al.
7,712,147 B2   5/2010    Lenssen et al.
(Continued)

FOREIGN PATENT DOCUMENTS

CN   101673249 A   3/2010
CN   202795383 U   3/2013
(Continued)

OTHER PUBLICATIONS

International Search Report and Written Opinion Issued in PCT Patent Application No. PCT/CN2014/080948, dated Mar. 27, 2015, 12 Pages.
(Continued)

*Primary Examiner* — Amare F Tabor
(74) *Attorney, Agent, or Firm* — Fiala & Weaver P.L.L.C.

(57) ABSTRACT

Methods, systems, and computer program products are provided for protecting stored data. A user interface module enables a data sensitivity level, a data protection response, and a contextual trigger to be associated with data stored in a computing device. The user interface is configured to enable the data protection response to be selected from a plurality of data protection responses that includes a soft delete and a hard delete. A contextual trigger monitor is configured to monitor for an occurrence of the contextual trigger. A data protection enactor is configured to enact the data protection response associated with the data when an occurrence of the contextual trigger is detected.

20 Claims, 8 Drawing Sheets

(51) Int. Cl.
*G06F 21/32* (2013.01)
*H04L 29/06* (2006.01)
*G06F 3/01* (2006.01)
*G06F 3/0482* (2013.01)
*G06F 3/0488* (2013.01)

(52) U.S. Cl.
CPC .......... *G06F 3/04883* (2013.01); *G06F 21/32* (2013.01); *H04L 63/0861* (2013.01); *G06F 2221/2111* (2013.01); *G06F 2221/2143* (2013.01)

(56) References Cited

U.S. PATENT DOCUMENTS

| | | | |
|---|---|---|---|
| 8,195,939 B2* | 6/2012 | Reinart | G06F 21/6209 713/166 |
| 8,248,237 B2 | 8/2012 | Fitzgerald et al. | |
| 8,370,340 B1 | 2/2013 | Yu et al. | |
| 8,577,042 B2 | 11/2013 | Worthy | |
| 8,613,111 B2 | 12/2013 | Condorelli et al. | |
| 8,713,450 B2* | 4/2014 | Garbow | G06F 21/316 705/325 |
| 8,732,860 B2* | 5/2014 | Marron | G06F 21/86 726/34 |
| 8,826,443 B1* | 9/2014 | Raman | G06F 11/004 726/26 |
| 9,003,542 B1* | 4/2015 | MacKay | G06F 21/50 726/26 |
| 2005/0198525 A1* | 9/2005 | Trossen | H04L 63/20 726/22 |
| 2005/0289358 A1* | 12/2005 | Haselden | G06F 21/6227 713/187 |
| 2006/0206524 A1 | 9/2006 | Maclaurin | |
| 2007/0250920 A1 | 10/2007 | Lindsay | |
| 2007/0255946 A1 | 11/2007 | Kokubun | |
| 2008/0022133 A1 | 1/2008 | Sobel et al. | |
| 2008/0172745 A1 | 7/2008 | Reinart et al. | |
| 2009/0037720 A1 | 2/2009 | Cho | |
| 2009/0328238 A1 | 12/2009 | Ridewood et al. | |
| 2011/0145914 A1 | 6/2011 | Zhu | |
| 2011/0202999 A1* | 8/2011 | Logan | G06F 21/6227 726/26 |
| 2012/0036582 A1* | 2/2012 | Little | G06F 12/0261 726/26 |
| 2012/0102549 A1 | 4/2012 | Mazzaferri et al. | |
| 2012/0131365 A1 | 5/2012 | Tabone et al. | |
| 2013/0117867 A1 | 5/2013 | Fung | |
| 2013/0191908 A1* | 7/2013 | Klein | G06F 21/36 726/18 |
| 2013/0212367 A1 | 8/2013 | Ingalls et al. | |
| 2013/0254831 A1 | 9/2013 | Roach et al. | |
| 2014/0013576 A1 | 1/2014 | Barnes | |
| 2014/0033299 A1 | 1/2014 | McGloin et al. | |
| 2014/0075493 A1 | 3/2014 | Krishnan et al. | |
| 2014/0123322 A1 | 5/2014 | Hadley | |
| 2014/0132392 A1 | 5/2014 | Kady | |
| 2014/0143887 A1* | 5/2014 | Marston | G06F 21/62 726/27 |
| 2014/0188804 A1* | 7/2014 | Gokhale | G06F 21/6218 707/645 |
| 2015/0135260 A1* | 5/2015 | Ilyadis | H04L 63/20 726/1 |
| 2015/0302194 A1* | 10/2015 | Voelckel | G06F 21/88 726/22 |

FOREIGN PATENT DOCUMENTS

| | | |
|---|---|---|
| CN | 103037310 A | 4/2013 |
| CN | 103077339 A | 5/2013 |
| CN | 103324875 A | 9/2013 |
| EP | 2456247 A1 | 5/2012 |
| GB | 2348568 A | 10/2000 |
| WO | 2009018125 A1 | 2/2009 |

OTHER PUBLICATIONS

"Secure Mobile Computing using Biotelemetrics", Published on: Dec. 16, 2008, Available at: http://www.cs.virginia.edu/~acw/SecureMobileComputing/, 4 pages.

Peacock, et al., "Typing Patterns: A Key to User Identification", In Journal of IEEE Security and Privacy, vol. 2, Issue 5, Sep. 2004, 8 pages.

Bo, et al., "SilentSense: Silent User Identification via Dynamics of Touch and Movement Behavioral Biometrics", In Proceedings of the 19th annual international conference on Mobile computing & networking, Sep. 30, 2013, 9 pages.

Seifert, et al., "TreasurePhone: Context-Sensitive User Data Protection on Mobile Phones", In Proceedings of the 8th international conference on Pervasive Computing, May 17, 2010, 8 pages.

Liu, et al., "System for Data Protection in Power off Mode", U.S. Appl. No. 14/400,528, 51 pages.

Liu, et al., "Data protection based on device user recognition", unfiled US Patent Application, 58 pages.

Liu, et al., "Data Protection Through Implicit User Logon Mechanisms", unfiled US Patent Application, 60 pages.

Liu, et al., "Fast Data Protection using Dual File Systems", U.S. Appl. No. 14/401,062, 49 pages.

Liu, et al., "Data Protection System Based on User Input Patterns on Device", U.S. Appl. No. 14/400,529, 48 pages.

"Search Report Issued in European Patent Application No. 14895867.1", dated Jan. 19, 2018, 7 Pages.

"First Office Action and Search Report Issued in Chinese Patent Application No. 201480048056.2", dated Apr. 3, 2018, 14 Pages.

"First Office Action and Search Report Issued in Chinese Patent Application No. 201480047891.4", dated Apr. 2, 2018, 16 Pages.

"Non-final Office Action Issued in U.S. Appl. No. 14/400,528", dated May 14, 2018, 21 Pages.

"Second Office Action Issued in Chinese Patent Application No. 201480047891.4", dated Sep. 5, 2018, 7 Pages.

"Second Office Action Issued in Chinese Patent Application No. 201480047932.X", dated Aug. 13, 2018, 12 Pages.

"Second Office Action Issued in Chinese Patent Application No. 201480047957.X", dated Oct. 19, 2018, 20 Pages.

"Notice of Allowance Issued in U.S. Appl. No. 14/402,982", dated Sep. 14, 2018, 11 Pages.

* cited by examiner

SYSTEM FOR CONTEXT-BASED DATA PROTECTION

This application is a U.S. national phase of International Application No. PCT/CN2014/080948 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require a particular password or PIN to be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to the device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable data to be securely protected on computing devices. Data on a computing device may be assigned a sensitivity level (e.g., sensitive, non-sensitive, etc.), a contextual trigger, and a data protection response. The contextual trigger is monitored for, and if detected to occur, the assigned data protection response is enacted to protect the data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
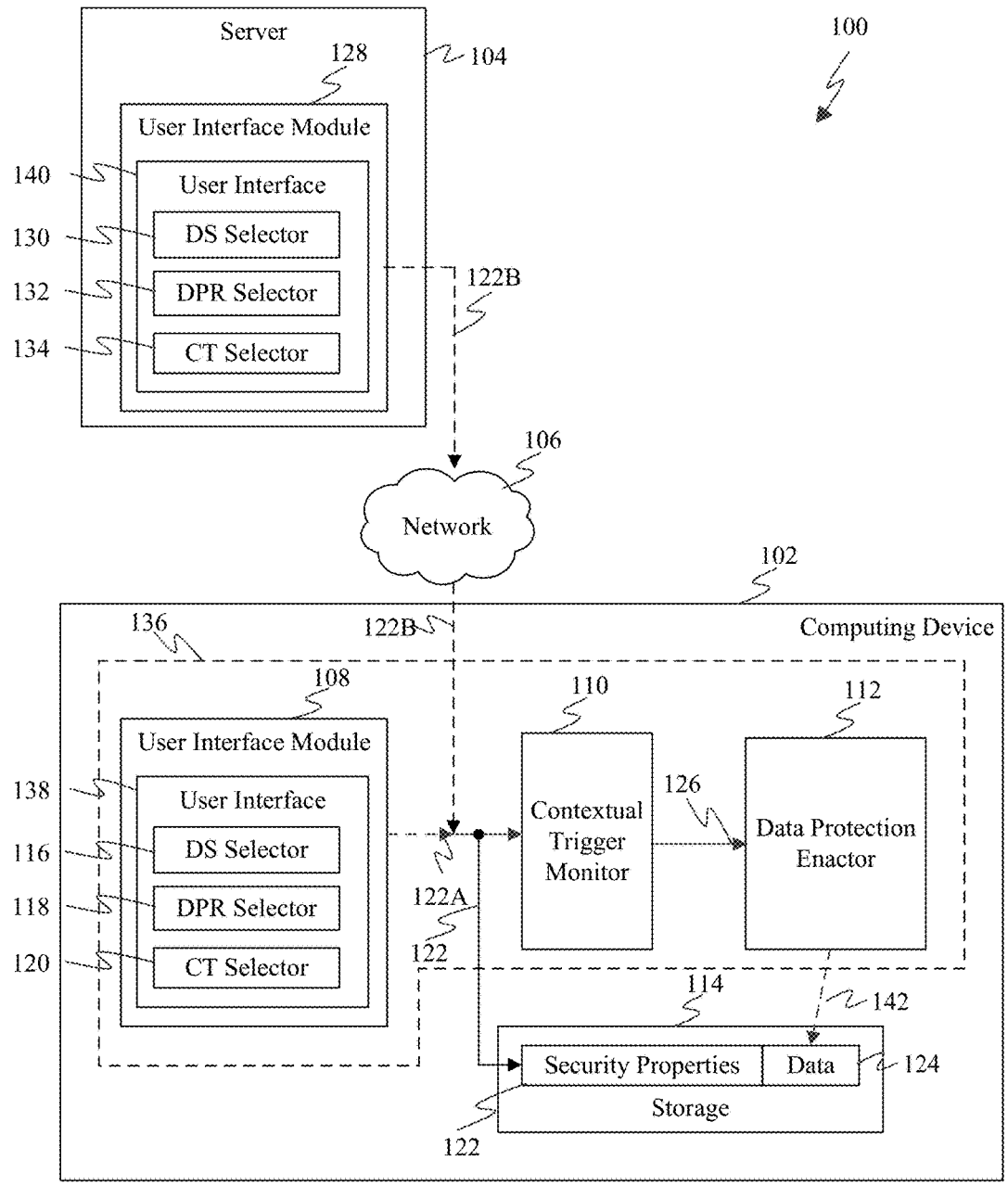
FIG. 1 shows a block diagram of a data protection environment that includes a data protection system configured to protect data stored on a computing device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes exemplary data protection environments that include a computing device that implements contextually triggered data protection. Section III describes an exemplary embodiment where location is used as a contextual trigger for data protection. Section IV describes an exemplary embodiment where a biometric condition is used as a contextual trigger for data protection. Section V describes example mobile and desktop device implementations of the computing device. Section VI provides some example embodiments. Section VII provides some concluding remarks.

II. Example Embodiments for Contextually Triggered Data Protection

Embodiments described herein enable protection of data stored on devices in a configurable and automatic manner based on context. Context-based data protection enables a user to set up policies to protect data on devices against undesired access, such as in situations where a device has been stolen, where the device is being used against the user's will (e.g., the user has been forced to give out the device password, the device has been taken away while in active operation, etc.), and in other situations. Predefined actions are automatically executed to protect the data when a risky external context is detected so as to prevent the data from being compromised.

Context-based data protection systems guard against access that is unintentionally or unwillingly authorized by users. Data is automatically protected from being compromised when a risky context is identified.

Embodiments for context-based data protection enforcement and execution architectures are provided. An enforcement architecture may be used to define data sensitivity levels (e.g., Level 1, Level 2, etc.), data protection responses (e.g., soft delete, hard delete, etc.), risk/trigger contexts (Context 1, Context 2), and a mapping between these elements (e.g., Level 1->Context 1->soft delete, which indicates that Level 1 content is to be soft deleted when Context 1 is detected). An execution architecture is configured to activate the predefined action/response to ensure the data is protected. Actions such as a "soft delete" (hiding of data) can be recovered from, while a "hard delete" erases data completely without an option for recovery of the data.

In embodiments, potential risky situations can arise in any device state, and techniques for the user to inform the system discretely or for the system to detect the situation automatically are provided. A context-based data protection architecture can be implemented and enforced with any one of or combination of the following control points:

Device in the powered off state: Enforcement can be accomplished by including an additional chipset (e.g., an additional processor, OS, etc.) in the device to implement tamper detection.

Device in the boot up state: The device can automatically boot into a data protection mode when a predefined key interrupt (e.g., a particular key combination, etc.) is not provided by the user.

Device in the user login state: An alternate password than the general device login password may need to be entered for a user account that is tied to data protection.

Device in the operation state:
A physical location of the device can indicate possible threats.
A camera of the device can detect a number of people facing the device within a particular distance to identify a risky environment.
A device can be stolen or taken when it is in operation and not protected, and whether a user of the device is legitimate may be determined based on a user interface (UI) input pattern (e.g., a keyboard/finger touch area, size/mouse usage pattern, etc.).
A device may be configured to detect a biometric signal of a user to determine a risk (e.g., login user is under duress and therefore data protection may be enacted discretely).

Device in the shutting down state: The device may be forced to shut down without the user's permission. In this case, when a shutdown password is not provided, a risk to data stored by the device may be identified.

In an example embodiment, data protection is configured for selected data on a device as follows. In an illustrative example used in the following several paragraphs, biometric information from a user of the device is configured as the contextual trigger for activating the data protection:

(A) The content to be protected, the context trigger, and the protection response are defined. For instance, the file(s) and/or the folder(s) defining the content to be protected are specified. The contextual trigger and the associated data protection policy are set for the content. Numerous different types of context triggers may selected, including biometric information. For example, data protection context can be tied to the physical condition of the user (e.g., the user's heart rate, sweat level, facial expression, etc.). Unusual/abnormal operating values for the physical condition can be defined, as well as the associated action/response to take. (e.g., if heart rate >100 bpm->delete sensitive content.)

(B) The context of access to the content is monitored and recognized. There are many ways to detect the context depending on the particular context configuration. For example, with respect to biometric information, the device may detect an abnormal physical condition of the user and trigger the predefined action/response. Sensors (onboard and/or remote to the device) can monitor various physical conditions of the user, such as a distance of the user from the device, heart rate, sweat level, temperature, blood pressure, etc.

(C) Various possible responses can be taken to protect the data in the event that the contextual trigger is detected. Examples of such data protection responses include one or more of: a hard delete, where data marked as sensitive is automatically deleted from the device without any option for recovery; a soft delete, where data marked as sensitive is automatically hidden by the operating system (OS) by deleting the links to the data and storing the links in a safe location (soft deleted data is stored, but not visible by the user, the protected data can be encrypted, etc.); an alert may be provided to the user (e.g., a message, a sound, a visual alert, etc.); a file may be disabled from opening; an opened window displaying the data may be closed; the opened window may be hidden behind other windows; etc.

(D) If the data is soft deleted as a data protection response, the data may later be recovered by the OS. When data is soft deleted, only the links to the data (e.g., files) are deleted. The data can be recovered/restored by restoring the links from a safe store. In one embodiment, the restoration of the data can be automatic, such as the next time that the user logs in with the correct password and correct password entering context. Alternatively, the restoration may be triggered by a correct password context.

Accordingly, embodiments provide for features, such as methods and systems for automatic and discrete triggering of data protection against external risky environments in which the user is located, methods and systems for defining sensitive data to be protected via a content attribute, data protection that covers the data on the device for all accounts, and methods and systems for defining the user's biometric information as the context for activating the sensitive data deletion.

In another example embodiment, data protection is configured for selected data on a device as follows. In this embodiment of the context described in the next several paragraphs, a location of the device is configured as the contextual trigger for activating the data protection:

(A) The content to be protected, the context trigger, and the protection response are defined. For instance, the file(s)/folder(s) defining the content to be protected are specified. The contextual trigger and the associated data protection policy are set for the content. A geographic location is set as the data protection context, such as by using geo-coordinates, a map, etc. For example, sensitive data may be configured to be (hard or soft) deleted when the device is in a specific country. A mapping between a data sensitivity level of the content, the context, and the data protection response is configured.

(B) A location of the device is determined. For instance, a current location of the device can be determined using one or more of GPS (global positioning system), a cellular network (e.g., if the device has a SIM card), an IP (Internet protocol) address of an HTTP proxy, etc. Alternatively, a near future location of the device can be predicted based on a traveling path of the device (e.g., determined by tracking the location of the device over time). The future location of the device can also be determined by analyzing a calendar of the user on the device, if available (e.g., a location of an appointment), and/or can be determined in other ways.

(C) Various possible data protection responses can be taken to protect the data in the event that the device is determined to be at the pre-determined location, or predicted to soon be at the pre-determined location. Examples of such data protection responses include those described elsewhere herein or otherwise known, such as an alert, hard delete, soft delete, etc.

(D) If the data is soft deleted as a data protection response, the data may later be recovered by the OS. Such recovery of the data may be performed as described elsewhere herein or otherwise known.

Note that in embodiments, one or more of such data protections may be performed "discretely," such that a user handling device is not aware of the data protection response being performed. For instance, a person handling a device may cause a data protection response to be enacted by tampering with the device (e.g., attempting to open a housing of the device to get at device memory), by failing to enter a passcode or key sequence at the correct time, by transporting the device to a particular location, by interacting with a device UI in an unfamiliar manner, by a biometric condition of the person being sensed, etc. The data protection response may be enacted in a discrete manner, such that the person is unaware that the response is being performed. For instance, the data may be hidden, soft deleted, or hard deleted discretely, such that the person is not even aware that the data is or was ever present on the device. Additionally, or alternatively, displayed windows may be rearranged before the person has seen the prior arrangement of the windows, an alert may be transmitted to an owner or administrator of the device without the person's knowledge, and/or other data protection responses may be performed in a discrete manner.

Such discrete performance of data protection can have various benefits. For instance, an unauthorized person attempting to access sensitive data on a device may trigger a soft deleting or hiding of that sensitive data. If the unauthorized person is not aware that the data is or was ever present on the device, and does not immediately find the data on the device (because it is hidden or soft deleted), that person may more quickly lose interest in attempting to find the data on the device. Furthermore, if an authorized user of the device is under threat from the unauthorized person, the authorized user has greater plausible deniability as to any presence of the data on the device.

Accordingly, embodiments provide for features, such as methods and systems for enforcing location-based data protection for users using soft and/or hard deletes trigged by a device's geo-presence, methods and systems for using a combination of soft and hard positioning sensors to determine device location and to trigger data protection mechanisms, and methods and systems for the early warning of data risk based on the traveling path of the device and/or the calendar schedule of the user.

Further description of data protection embodiments is provided in the following subsections. For instance, the immediately following subsection describes further embodiments for the configuring of protections on data, followed by a subsection that describes further embodiments for the triggering and enactment of data protection.

A. Example Embodiments for Configuring Data Protection

Data protection systems may be configured in various ways to protect data from undesired access, in embodiments. For instance, FIG. 1 shows a block diagram of a data protection environment 100 that includes a data protection system 136 configured to protect data stored on a computing device 102, according to an example embodiment. As shown in FIG. 1, data protection environment 100 includes computing device 102 and a server 104. Computing device 102 and server 104 are communicatively coupled by a network 106. Data protection system 136 is included in computing device 102. In the embodiment of FIG. 1, data protection system 136 includes a user interface module 108, a contextual trigger monitor 110, a data protection enactor 112, and storage 114. Furthermore, server 104 includes a user interface module 128. The features of environment 100 are described as follows.

As shown in FIG. 1, data protection system 136 may be implemented in computing device 102. Note that in another embodiment, data protection system 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface 128 of server 104 may be part of data protection system 136 along with contextual trigger monitor 110 and data protection enactor 112. In another embodiment, both of user interfaces 108 and 128 may be present and part of data protection system 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 114 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

Data 124 shown stored in storage 114 may be any type of data, including one or more files, one or more folders, a combination of files and folders, and/or any other type of data structure and/or number of data structures. Although a single instance of data (data 124) is shown stored in storage 114, the single instance of data is shown in FIG. 1 for ease of illustration. It is to be understood that any number of instances of data may be stored in storage 114, with each instance being one or more files and/or folders of any size having corresponding security parameters configured as disclosed herein.

Examples of network 106 include a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

A user may interact with user interface module 108 (when present) at computing device 102, or may interact with user interface module 128 (when present) at server 104, to configure data protection for data stored by computing device 102, such as data 124 stored in storage 114. The user that configures the data protection may be an owner or other user of computing device 102, a system administrator (e.g., when computing device 102 is a device of an enterprise), or other person.

User interface module 108 at computing device 102 may be present as a convenient way for a user of computing device 102 to configure protection for data stored in computing device 102. User interface module 108 may be part of a data protection application stored in computing device 102 (e.g., a standalone desktop or mobile application, an "app" that is partially cloud-based, etc.), may be part of an OS of computing device 102, or may be present and configured in computing device 102 in another manner.

When interacting with a user interface generated by user interface module 108, a user may be enabled to determine stored data in storage 114, such as data 124, to select such data for data protection configuration. The user may interact with the user interface to configure data protection for data 124, and may store the data protection configuration in association with data 124 as security properties 122.

In another embodiment, it may be desired to not have user interface module 108 in computing device 102. For instance, it may be determined to be a security weakness if any person who obtains and is able to log into computing device 102 has access to user interface 108, and therefore can configure (including remove) protections for data stored at computing device 102. In such an embodiment, user interface module 108 may not be present at computing device 102, and instead, user interface module 128 may be present at server 104 to be used to configure protection for data stored in computing device 102. For example, user interface module 128 may be part of a data protection application (or the OS) stored in server 102 that is not network accessible, may be part of a network accessible application (e.g., a browser accessible application), or may be present and configured in server 104 in another manner.

When interacting with a user interface generated by user interface module 128 of server 104, a user may be enabled to determine stored data at computing device 102 through network 106, such as data 124, to select such data for data protection configuration. The user may interact with the user interface to configure data protection for data 124, and may store the data protection configuration in association with data 124 as security properties 122.

Figure 2:
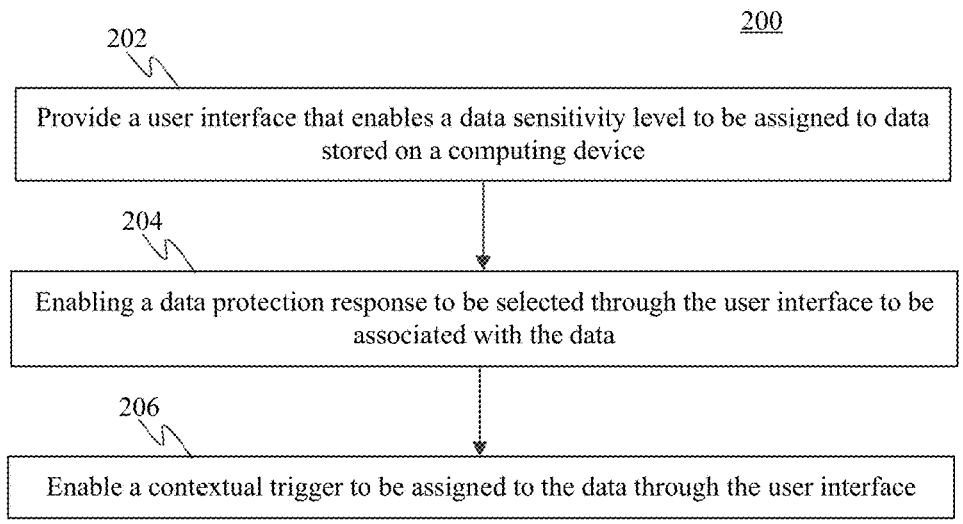
FIG. 2 shows a flowchart providing a process for configuring protection for stored data, according to an example embodiment.

User interface module 108 and/or user interface module 128 may be used to configure data protection in any manner, in embodiments. For instance, in an embodiment, user interface module 108 and/or user interface module 128 may operate according to FIG. 2. FIG. 2 shows a flowchart 200 providing a process for configuring protection for stored data, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, a user interface is provided that enables a data sensitivity level to be assigned to data stored on a computing device. For example, as shown in FIG. 1, user interface module 108

(when present) may generate a user interface 138, and user interface module 128 (when present) may generate a user interface 140. User interface 138 and user interface 104 may each be any type of user interface that includes any number of user interface elements, including a graphical user interface, a touch interface, a voice control interface, a haptic interface, a gesture interface, etc.

In an embodiment, user interface 138 and/or user interface 140 may be provided to enable a data sensitivity level to be assigned to data stored on computing device 102, such as data 124. As shown in FIG. 1, user interface 138 includes a first data sensitivity (DS) selector 116, and user interface 140 includes a second DS selector 130. DS selector 116 and/or DS selector 130, depending on which is present, may be interacted with by a user to assign a data sensitivity level to data 124. For instance, DS selector 116 and/or DS selector 130 may be a user interface element such as a checkbox, a toggle switch, a button, a pull down menu, or another user interface element. The user may interact with the user interface element to select a data sensitivity for data 124. For example, a user may interact with DS selector 116 or DS selector 130 to designate selected data as either sensitive or non-sensitive. In an embodiment, a user may also interact with DS selector 116 or DS selector 130 to designate selected data as having differing degrees of sensitivity (e.g., not sensitive, moderately sensitive, highly sensitive, etc.).

In step 204, a data protection response is enabled to be selected through the user interface to be associated with the data. In an embodiment, user interface 138 and/or user interface 140 may be provided to enable a data protection response to be assigned to data stored on computing device 102, such as data 124. The data protection response is to be enacted with regard to the data in the event that the data is determined to at least potentially be threatened with undesired or risky access (e.g., computing device 102 is misplaced, is potentially stolen, is known to have been stolen, is potentially being accessed by an unauthorized person, a user of computing device 102 is being forced to access the data, etc.).

As shown in FIG. 1, user interface 138 includes a first data protection response (DPR) selector 118, and user interface 140 includes a second DPR selector 132. DPR selector 118 and/or DPR selector 132, depending on which is present, may be interacted with by a user to assign a data protection response to data 124. For instance, DPR selector 118 and/or DPR selector 132 may be any type of user interface element disclosed herein or otherwise known. The user may interact with the user interface element to select a data protection response for data 124. Various types of data protection responses may be available for selection and assignment to data 124.

Figure 3:
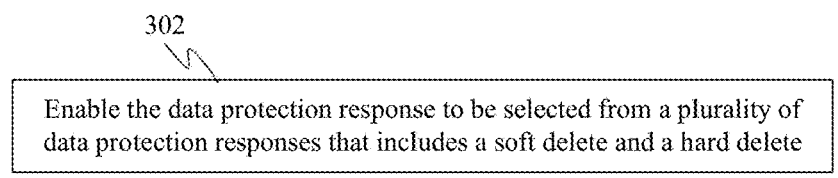
FIG. 3 shows a process for selecting a data protection response for data, according to an example embodiment.

For instance, in an embodiment, step 204 of flowchart 200 may include a process shown in FIG. 3. FIG. 3 shows a step 302 for selecting a data protection response for data, according to an example embodiment. In step 302, the data protection response is enabled to be selected from a plurality of data protection responses that includes a soft delete and a hard delete. Thus, in an embodiment, DPR selector 118 and/or DPR selector 132 may provide a list of data protection responses, and one or more of the data protection responses may be selected from the list and assigned to the data (e.g., by a pull down menu, checkboxes, etc.). The data protection response may comprise hard deleting the data or soft deleting the data. As will be discussed in more detail herein, a "hard delete" comprises rendering data permanently inaccessible (e.g., overwriting the data in memory/ storage), while a "soft delete" comprises rendering the data temporarily inaccessible such that it may be recovered at a subsequent time.

Figure 4:
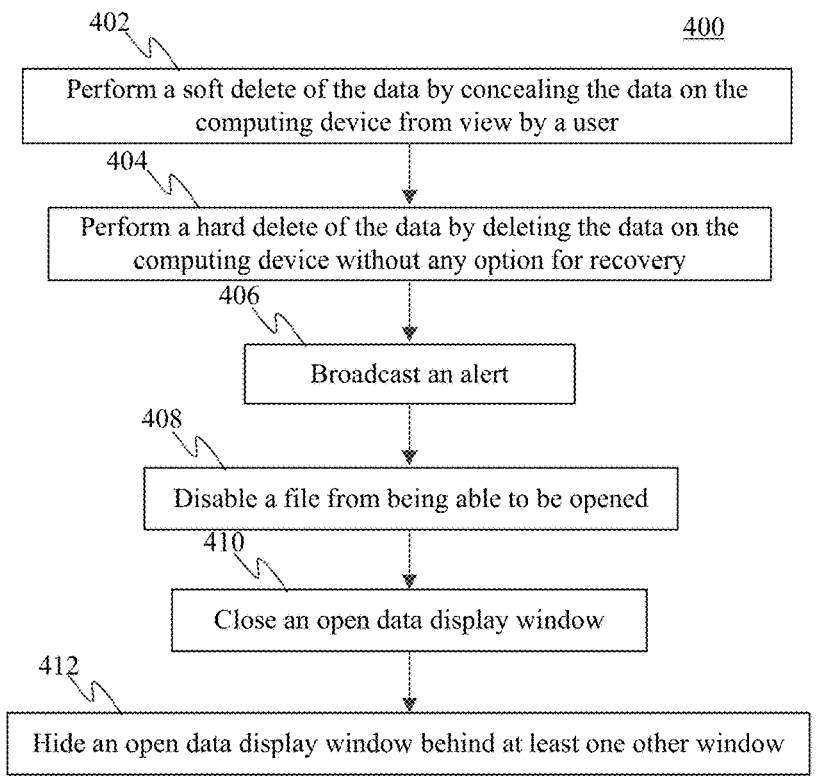
FIG. 4 shows a flowchart that is a list of selectable data protection responses, according to an example embodiment.

Further types of data protection responses may be selected from. For instance, FIG. 4 shows a flowchart 400 providing a process for selectable data protection responses, according to an example embodiment. Each step of flowchart 400 describes a separate and independent data protection response. Any one or more of the data protection responses described in flowchart 400 may be selected and assigned to a particular instance of data. Flowchart 400 is described as follows. Further structural and operational embodiments will be apparent to persons skilled in the relevant art(s) based on the following description.

Flowchart 400 begins with step 402. In step 402, a soft delete of the data is performed by concealing the data on the computing device from view by a user. As described above, DPR selector 118 and/or DPR selector 132 may provide an option for a soft delete to be assigned as a data protection response for data. According to a soft delete, the data is concealed on computing device 102 from view by a user. For instance, links to a file that represents the data may be deleted, and the links and/or data may be stored in a location considered safe for possible later recovery/restoration.

In step 404, a hard delete of the data is performed by deleting the data on the computing device without any option for recovery. As described above, DPR selector 118 and/or DPR selector 132 may provide an option for a hard delete to be assigned as a data protection response for data. According to a hard delete, the data is deleted from storage (e.g., storage 114) in a manner that the data cannot be recovered or restored. For instance, the storage location where the data was stored may be overwritten with a pattern of ones and zeroes.

In step 406, an alert is broadcast. In an embodiment, DPR selector 118 and/or DPR selector 132 may provide an option for an alert to be assigned as a data protection response for data. An alert may be configured to notify an authorized user of computing device 102 (e.g., the owner, a system administrator, etc.) that the data may be threatened with unauthorized access. The alert may be delivered/transmitted to an address of phone number of the authorized user, or presented in another form, including as an email message, a text message, a social network message, a phone call, a beeping noise (or other sound), etc.

In step 408, a file is disabled from being able to be opened. In an embodiment, DPR selector 118 and/or DPR selector 132 may provide an option for disabling one or more files (representing data) from being able to be opened as a data protection response for the data. The file(s) may be disabled from being opened in any manner, including by locking the file(s), increasing permissions on the file(s) (above the access rights of the user), etc.

In step 410, an open data display window is closed. In an embodiment, DPR selector 118 and/or DPR selector 132 may provide an option for closing an open display window that displays data as a data protection response for the data.

In step 412, an open data display window is hidden behind at least one other window. In an embodiment, DPR selector 118 and/or DPR selector 132 may provide an option for hiding an open display window behind one or more other windows as a data protection response for the data. For instance, the data display window may be moved behind one or more other windows that are already open, and/or one or more new windows may be opened in front of the data display window.

Note that, as described herein, DPR selector 118 and/or DPR selector 132 may be interacted with to assign a data protection response to data. In another embodiment, a data protection response may be pre-associated with a data sensitivity, and when the data sensitivity level is assigned to particular data, the associated data protection response is also assigned to the data. For instance, a soft delete may be associated with a low data sensitivity level, and a hard delete may be associated with a high data sensitivity level. If a low sensitivity level is assigned to particular data (in step 202 of flowchart 200), the soft delete is also automatically assigned to the particular data (in step 204).

Referring back to FIG. 2, in step 206, a contextual trigger is enabled to be assigned to the data through the user interface. In an embodiment, user interface 138 and/or user interface 140 may be provided to enable a contextual trigger to be assigned to data stored on computing device 102, such as data 124. The contextual trigger may be a condition or set of conditions that, when detected, indicate that computing device 102 has become subject or susceptible to an unauthorized access.

As shown in FIG. 1, user interface 138 includes a first contextual trigger (CT) selector 120, and user interface 140 includes a second CT selector 134. CT selector 120 and/or CT selector 134, depending on which is present, may be interacted with by a user to set a contextual trigger, the detection of which causes a data protection mode to be activated by data protection enactor 112. For instance, CT selector 120 and/or CT selector 134 may be any type of user interface element disclosed herein or otherwise known. The user may interact with the user interface element to select a contextual trigger for data 124. Examples of contextual triggers include but are not limited to: sensing that unauthorized users are in close proximity to computing device 102; tampering with computing device 102; failure of a user to provide required input during device boot-up, login, or shut down; and sensed behaviors of a user of computing device 102 indicating that the user is not an authorized user. A wide variety of other contextual triggers may be used as well.

Figure 5:
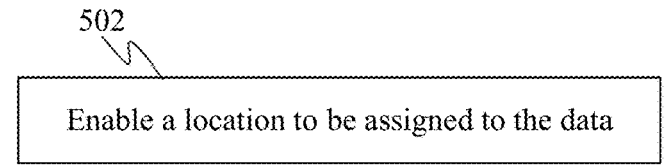
FIG. 5 shows a process for assigning a location to data as a contextual trigger, according to an example embodiment.

In an embodiment, a location may be a contextual trigger. For instance, FIG. 5 shows a step 502 for assigning a location to data as a contextual trigger, according to an example embodiment. In step 502, a location is enabled to be assigned to the data. The location is a contextual trigger, such that when computing device 102 is at the location, is predicted to reach the location in the future, is not at the location, is heading away from the location, and/or has other relationship with the location, the location-based contextual trigger may be detected (depending on the particular configuration).

CT selector 120 and/or CT selector 134 may enable the location to be selected in various ways, including enabling the location to be selected as a point on a map, as a region on a map, by textual entry (e.g., typing in a city name, state name, county name, country name, company name, physical address, coordinates, etc.), etc. A region may be selected on a map in various ways, such as by selecting a city, state, county, country, building, etc., by drawing a line on the map the encloses the region, etc.

Figure 6:
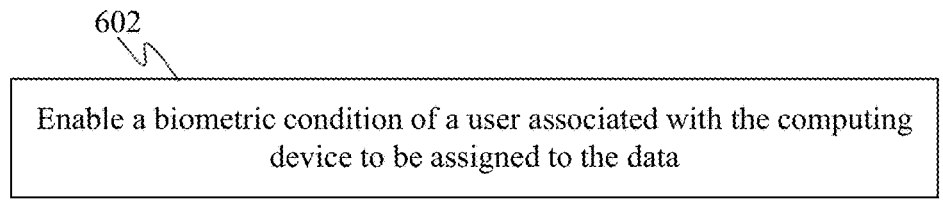
FIG. 6 shows a process for assigning a biometric condition to data as a contextual trigger, according to an example embodiment.

In another example, FIG. 6 shows a step 602 for assigning a biometric condition to data as a contextual trigger, according to an example embodiment. In step 602, a biometric condition of a user associated with the computing device is enabled to be assigned to the data. According to step 602, a biometric condition of an authorized user of computing device 102 may be a contextual trigger for data. If sensed biometric information associated with the authorized user indicates that the authorized user is in distress, this may indicate that the undesired access of the data is potentially threatened. Any one or more suitable biometric conditions of an authorized user may be assigned to data as a contextual trigger.

For illustrative purposes, some example biometric conditions of an authorized user that may be used as contextual triggers are listed as follows: heart rate (e.g., a heart rate greater than a predetermined threshold high heart rate value, a heart rate lower than a predetermined threshold low heart rate value, etc.), sweat level (a sweat level greater than a predetermined threshold high sweat level value, a sweat level lower than a predetermined threshold low sweat level value, etc.), temperature (a temperature greater than a predetermined threshold high temperature level value, a temperature lower than a predetermined threshold low temperature level value, etc.), blood pressure (a blood pressure reading greater than a predetermined threshold high blood pressure value, a blood pressure reading lower than a predetermined threshold low blood pressure value, etc.), pupil size, vibration indicating nervousness, etc. These examples are not intended to be limiting, and any other measureable biometric conditions may be suitable as contextual triggers.

As described above, the sensitivity level, data protection response, and contextual trigger may be selected for assignment to data 124. Selections of sensitivity level, data protection response, and contextual trigger made at computing device 102 are output from user interface module 108 as security properties 122A. Selections of sensitivity level, data protection response, and contextual trigger made at server 104 are output from user interface module 128 as security properties 122B, and are transmitted in a communication signal over network 106 to computing device 102. Security properties 122A or 122B may be stored in association with data 124 as security properties 122.

B. Example Embodiments for Triggering and Enacting Data Protection

Figure 7:
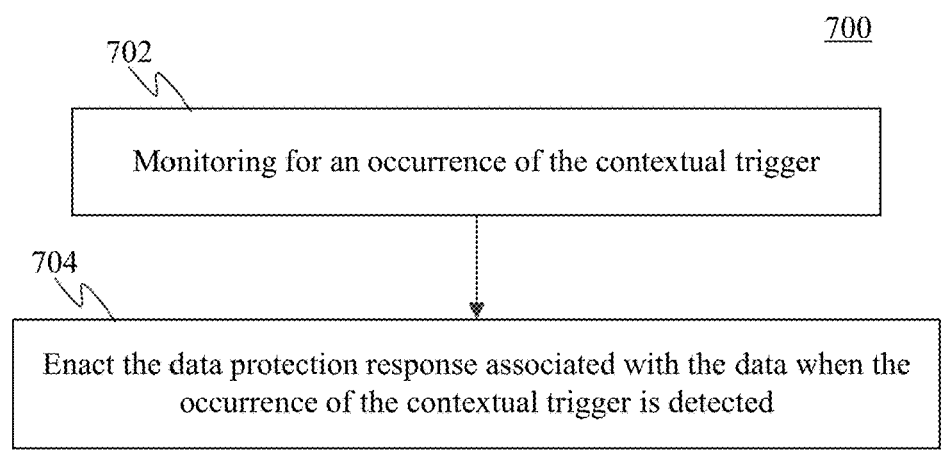
FIG. 7 shows a flowchart providing a process for monitoring a contextual trigger associated with data to trigger enactment of a data protection response, according to an example embodiment.

Data protection systems may be configured in various ways to monitor for data threatened with unauthorized access, and to enact data protection policies to protect the data. For instance, as described above with respect to FIG. 1, data protection system 136 in computing device 102 includes contextual trigger monitor 110 and data protection enactor 112. Contextual trigger monitor 110 and data protection enactor 112 are configured to detect unauthorized access of data, and to enact data protection. Contextual trigger monitor 110 and data protection enactor 112 are described as follows with respect to FIG. 7. FIG. 7 shows a flowchart 700 providing a process for monitoring a contextual trigger associated with data to trigger enactment of a data protection response, according to an example embodiment. Flowchart 700, contextual trigger monitor 110 and data protection enactor 112 are described as follows. Further structural and operational embodiments will be apparent to persons skilled in the relevant art(s) based on the following description.

Flowchart 700 begins with step 702. In step 702, an occurrence of the contextual trigger is monitored for. For example, as shown in FIG. 1, contextual trigger monitor 110 receives the contextual trigger(s) of security properties 122 associated with data 124. Contextual trigger monitor 110 may receive the contextual trigger(s) of security properties 122 directly from user interface module 108 or from storage 114. Contextual trigger monitor 110 operates over time to determine if any of the contextual trigger(s) have been detected. If contextual trigger monitor 110 determines that a contextual trigger has been detected, then contextual trigger monitor 110 notifies data protection enactor 112 by generating a trigger notification 126.

In step 704, the data protection response associated with the data is enacted when the occurrence of the contextual trigger is detected. In response to trigger notification 126, data protection enactor 112 may enact the data protection response(s) in security properties 122 associated with data 124. The enacted data protection response is illustrated as enacted action 142 in FIG. 1.

In embodiments, the data protection response in security properties 122 may indicate, and data protection enactor 112 may enact, any one or more data protection responses mentioned herein or otherwise known. For example, the data protection response may indicate and data protection enactor 112 may enact any one or more of the data protection responses shown in flowchart 400 (FIG. 4) and described elsewhere herein, and/or any other suitable data protection responses that would be apparent to persons skilled in the relevant art(s) based on the teachings herein. Accordingly, data protection enactor 112 may include or access functionality for performing one or more data protection responses. For instance, data protection enactor 112 may include or access a file manager module capable of performing soft deletes of files and/or folders (which may include file encryption, file/folder moving and/or renaming, reconfiguring links to files/folders, etc.). Data protection enactor 112 may include or access a messaging module configured to send alert messages (e.g., a texting tool, an email tool, an instant messaging tool, a social network messaging tool, a phone communication tool, an audio tool, etc.). In another example, data protection enactor 112 may include or access a window management module (e.g., of an OS) capable of rearranging displayed windows and/or opening windows. Data protection enactor 112 may be configured with additional and/or alternative functionality for performing one or more data protection responses, as would be apparent to persons skilled in the relevant art(s) based on the teachings herein.

III. Example Embodiments for Location as a Trigger for Data Protection

Figure 8:
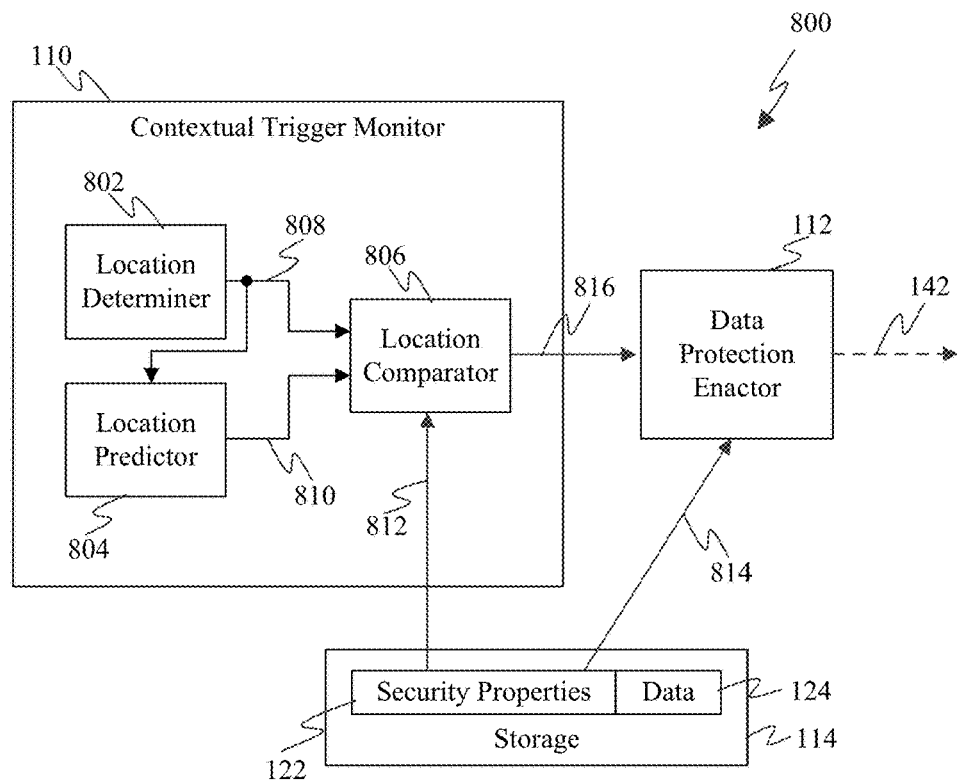
FIG. 8 shows a block diagram of a data protection system configured to use location as a contextual trigger for data protection, according to an example embodiment.

Contextual trigger monitor 110 may be configured in various ways to monitor for triggers indicating that data is threatened with unauthorized access. For instance, FIG. 8 shows a block diagram of a portion of a data protection system 800 configured to use location as a contextual trigger for data protection, according to an example embodiment. As shown in FIG. 8, data protection system 800 includes contextual trigger monitor 110 and data protection enactor 112. Furthermore, contextual trigger monitor 110 includes a location determiner 802, a location predictor 804, and a location comparator 806. In an embodiment, contextual trigger monitor 110 may perform step 702 of flowchart 700 (FIG. 7), and data protection enactor 112 may perform step 704 of flowchart 700. Data protection system 800 is an example of the corresponding portion of data protection system 136 shown in FIG. 1, and for ease of illustration, not all features of system 800 are necessarily shown in FIG. 8. Data protection system 800 may be included in computing device 102. Data protection system 800 is described as follows.

In the embodiment of FIG. 8, contextual trigger monitor 110 is configured to use location as a contextual trigger for data protection. In particular, as shown in FIG. 8, location determiner 802 is configured to determine a current location of computing device 102. The current location of computing device 102 may be determined by location determiner 802 in various ways, including using GPS (global positioning system) techniques, local positioning systems (e.g., using cellular base stations, Wi-Fi access points, radio towers, etc.), and/or using other positioning techniques, as would be known to persons skilled in the relevant art(s).

For example, in one embodiment, location determiner 802 may include a GPS module. The GPS module is configured to determine a location of a device. For instance, the GPS module may include one or more receivers that receive GPS signals from satellites for the purpose of determining a current location on Earth of the device. The GPS module may calculate its location by timing the signals transmitted by the GPS satellites. The GPS module may determine the transit time of each signal and may calculate the distance to each satellite. These distances, along with the locations of the satellites, may be used in a positioning algorithm (e.g., trilateration, etc.) to determine the location of the GPS module. The GPS module may generate the location in the form of latitude and longitude, and in some embodiments may also determine altitude. In other embodiments, the GPS module may determine location in other ways, as would be known to persons skilled in the relevant art(s).

As shown in FIG. 8, location determiner 802 generates a determined location 808, which indicates the current location of computing device 102 (FIG. 1). Determined location 808 may be a data structure having any form, and may contain location information in any format, such as GPS coordinates, latitude, longitude, altitude, etc.

Furthermore, location predictor 804 is optionally present in contextual trigger monitor 110. Location predictor 804 is configured to estimate or predict a future location or path of travel of computing device 102. Location predictor 804 may make this prediction in any manner. For instance, in an embodiment, location predictor 804 may receive determined location 808. Location predictor 804 may store determined location 808 at a time at which determined location 808 is determined, and may thereby track a series of determined locations and corresponding determination times as travel points. Location predictor 804 may perform interpolation between sequential travel points to create a line, and may extrapolate the line to estimate a future path of travel of computing device 102. Alternatively, location predictor 804 may estimate a future location or travel path of computing device 102 in other ways. For instance, in one embodiment, location predictor 804 may access a calendar (e.g., Microsoft® Outlook®, or other calendar application) of computing device 102 for locations indicated in appointments in the calendar in a predetermined future time period (e.g., the next hour, the next 6 hours, the next day, the next week, etc.). In this manner, location predictor 804 can predict that computing device 102 will be at the location of an appointment at the indicated appointment time.

As shown in FIG. 8, location predictor 804 generates a predicted location 810, which indicates one or more predicted future locations, and corresponding estimated times of arrival at those locations, of computing device 102 (FIG. 1). Predicted location 810 may be a data structure having any form, and may contain location information in any format, such as GPS coordinates, latitude, longitude, altitude, etc.

As shown in FIG. 8, location comparator 806 receives determined location 808 and/or predicted location 810, and receives a contextual trigger location 812 from security properties 122 associated with data 124. When determined location 808 is received, location comparator 806 compares determined location 808 to contextual trigger location 812, and generates a compare result 816. When predicted location 810 is received, location comparator 806 compares predicted location 810 to contextual trigger location 812, and generates compare result 816. In either case, data protection enactor 112 receives compare result 816, which is an example of trigger notification 126 (FIG. 1). Based on compare result 816, data protection enactor 112 may enact the data protection response(s) in security properties 122 associated with data 124. As shown in FIG. 8, data protection enactor 112 receives a data protection response 814 from security properties 122 associated with data 124. Data protection response 814 indicates the one or more data protection responses to be performed by data protection enactor 112 if compare result 816 indicates that data protection is to be enacted for data 124.

For instance, in an embodiment, determined location 808 may be generated by location determiner 802 and utilized. If determined location 808 matches contextual trigger location 812, compare result 816 indicates that data 124 may be threatened with unauthorized access, and that data protection response(s) 814 of security properties 122 therefore are to be performed. If determined location 808 does not match contextual trigger location 812, the data protection response is not performed. In one illustrative example, when a user carries computing device 102 into a country (indicated as contextual trigger location 812) deemed to be a security risk, compare result 816 may indicate a match occurred and data protection response 814 may be enacted by data protection enactor 112 with respect to data 124. In one embodiment, a match occurs when determined location 808 and contextual trigger location 812 are the same location. In another embodiment, a match occurs when determined location 808 is within a region defined by contextual trigger location 812.

In another embodiment, if determined location 808 does not match contextual trigger location 812, compare result 816 indicates that data 124 may be threatened with unauthorized access, and that data protection response(s) 814 of security properties 122 therefore are to be performed. If determined location 808 matches contextual trigger location 812, the data protection response is not performed. In one illustrative example, when a user has computing device 102 at a location within an office building of his/her company (indicated as contextual trigger location 812), compare result 816 may indicate a match occurred (indicating computing device 102 is safely within the company premises) and the data protection response is not enacted. In this example, if the user transports the computing device 102 to a location outside of the office building (indicating the security of the device and data may be threatened), the match no longer occurs, and data protection response 814 is enacted with respect to data 124.

In a further example, a user (e.g., an admin person) can tag data (e.g., a file) to be sensitive and only allowed within a corporate premise. Accordingly, a contextual trigger location may be assigned by the user to a zone/region defined by the corporate premises. If computing device 102 containing the data is taken out of the zone defined by the admin, and therefore determined location 808 no longer matches (no longer is within the bounds of) the contextual trigger location, the data can be soft or hard deleted as described herein. Note that in an embodiment, contextual trigger location 812 may be designated as a network of IP addresses, such that sensitive content cannot be transmitted outside this predefined sub-network/corporate network. Location determiner 802 may determine that a location/address to which the data is being attempted to be transmitted is outside of the network. Location comparator 806 may compare this determined location to the region defined by the network, can generate compare result 816 to indicate that a match does not occur, and an appropriate data protection response may be enacted (e.g., delete files, notify admin, etc.).

In still another embodiment, predicted location 810 may be generated by location predictor 804 and utilized. If predicted location 810 matches contextual trigger location 812, compare result 816 indicates that data 124 may be threatened with unauthorized access, and that data protection response(s) 814 of security properties 122 therefore are to be performed. If predicted location 810 does not match contextual trigger location 812, the data protection response is not performed. In one illustrative example, when a user carries computing device 102 along a path headed into a country (indicated as contextual trigger location 812) deemed to be a security risk, predicated location 810 may be generated to be that country. As a result, compare result 816 may indicate a match occurred and data protection response 814 may be enacted by data protection enactor 112 with respect to data 124. In one embodiment, a match occurs when predicted location 810 and contextual trigger location 812 are the same location. In another embodiment, a match occurs when predicted location 810 is within a region defined by contextual trigger location 812.

In another embodiment, if predicted location 810 does not match contextual trigger location 812, compare result 816 indicates that data 124 may be threatened with unauthorized access, and that data protection response(s) 814 of security properties 122 therefore are to be performed. If predicted location 810 matches contextual trigger location 812, the data protection response is not performed. In one illustrative example, when a user is transporting computing device 102 along a path that to a location that is outside of an office building of his/her company (indicated as contextual trigger location 812), compare result 816 may indicate a match did not occur (indicating computing device 102 is headed outside the company premises), and data protection response 814 is enacted with respect to data 124. In this example, if the user transports computing device 102 within the office building, but on a path to a location that is predicted to still be within the building, the match occurs, and the data protection response is not enacted.

Figure 9:
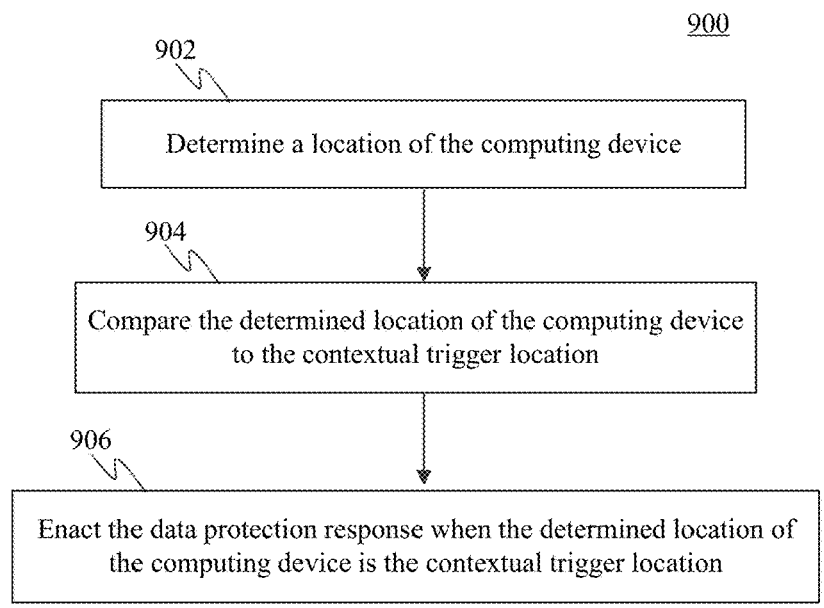
FIG. 9 shows a flowchart providing a process for enacting a data protection response for data based on a location trigger, according to an example embodiment.
Figure 10:
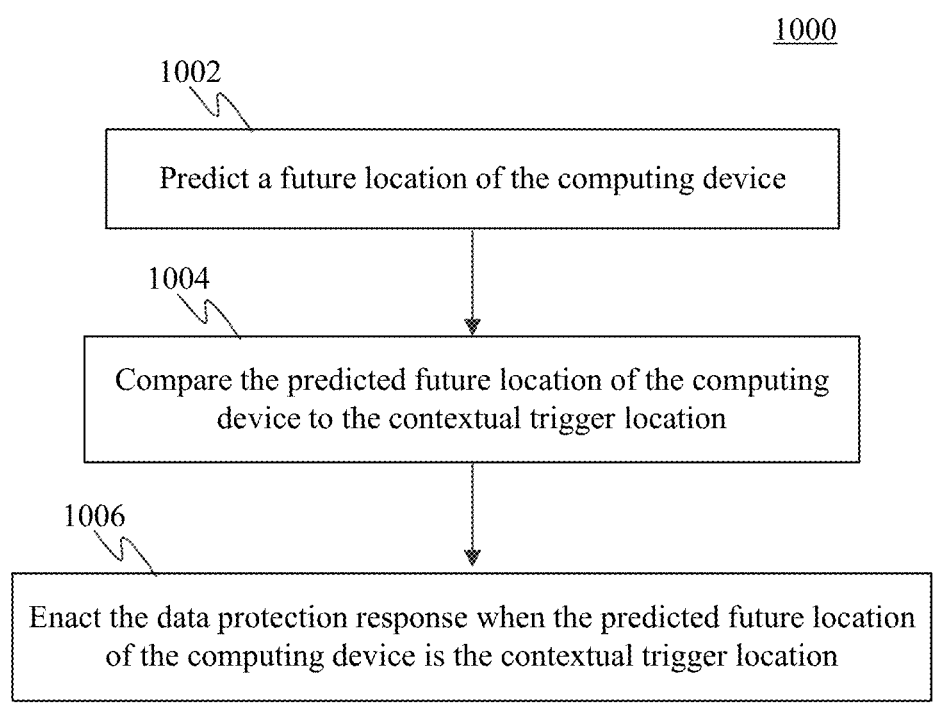
FIG. 10 shows a flowchart providing a process for enacting a data protection response for data based on a predicted future location as a trigger, according to an example embodiment.

Accordingly, data protection system 800 of FIG. 8 may operate according to FIGS. 9 and/or 10. FIG. 9 shows a flowchart 900 providing a process for enacting a data protection response for data based on a location, according to an example embodiment. FIG. 10 shows a flowchart 1000 providing a process for enacting a data protection response for data based on a predicted future location, according to an example embodiment. Flowcharts 900 and 1000 are described as follows with respect to FIG. 8.

Referring to FIG. 9, flowchart 900 begins with step 902. In step 902, a location of the computing device is determined. For instance, as described above, location determiner 802 (FIG. 8) may determine a location of computing device 102 (FIG. 1) as determined location 808.

In step 904, the determined location of the computing device is compared to the contextual trigger location. For example, as described above with respect to FIG. 8, when determined location 808 is received, location comparator 806 may compare determined location 808 to contextual trigger location 812 from security properties 122 associated with data 124.

In step 906, the data protection response is enacted when the determined location of the computing device is the contextual trigger location. For instance, as described above with respect to FIG. 8, data protection enactor 112 receives compare result 816. Based on compare result 816, data protection enactor 112 may enact the data protection response(s) in security properties 122 associated with data 124. In an embodiment, data protection enactor 112 may enact the data protection response(s) when determined location 808 and contextual trigger location 812 are the same location. In another embodiment, data protection enactor 112 may enact the data protection response(s) when determined location 808 is within a region defined by contextual trigger location 812. In still another embodiment, data protection enactor 112 may enact the data protection response(s) when determined location 808 and contextual trigger location 812 are not the same location (or when determined location 808 is outside of a region defined by contextual trigger location 812).

Referring to FIG. 10, flowchart 1000 begins with step 1002. In step 1002, a future location of the computing device is predicted. For instance, as described above, location predictor 804 (FIG. 8) may predict a future location of computing device 102 (FIG. 1) as predicted location 810.

In step 1004, the predicted future location of the computing device is compared to the contextual trigger location. For example, as described above with respect to FIG. 8, when predicted location 810 is received, location comparator 806 may compare predicted location 810 to contextual trigger location 812 from security properties 122 associated with data 124.

In step 1006, the data protection response is enacted when the predicted future location of the computing device is the contextual trigger location. For instance, as described above with respect to FIG. 8, data protection enactor 112 receives compare result 816. Based on compare result 816, data protection enactor 112 may enact the data protection response(s) in security properties 122 associated with data 124. In an embodiment, data protection enactor 112 may enact the data protection response(s) when predicted location 810 and contextual trigger location 812 are the same location. In another embodiment, data protection enactor 112 may enact the data protection response(s) when predicted location 810 is within a region defined by contextual trigger location 812. In still another embodiment, data protection enactor 112 may enact the data protection response(s) when predicted location 810 and contextual trigger location 812 are not the same location (or when predicted location 810 is outside of a region defined by contextual trigger location 812).

Figure 11:
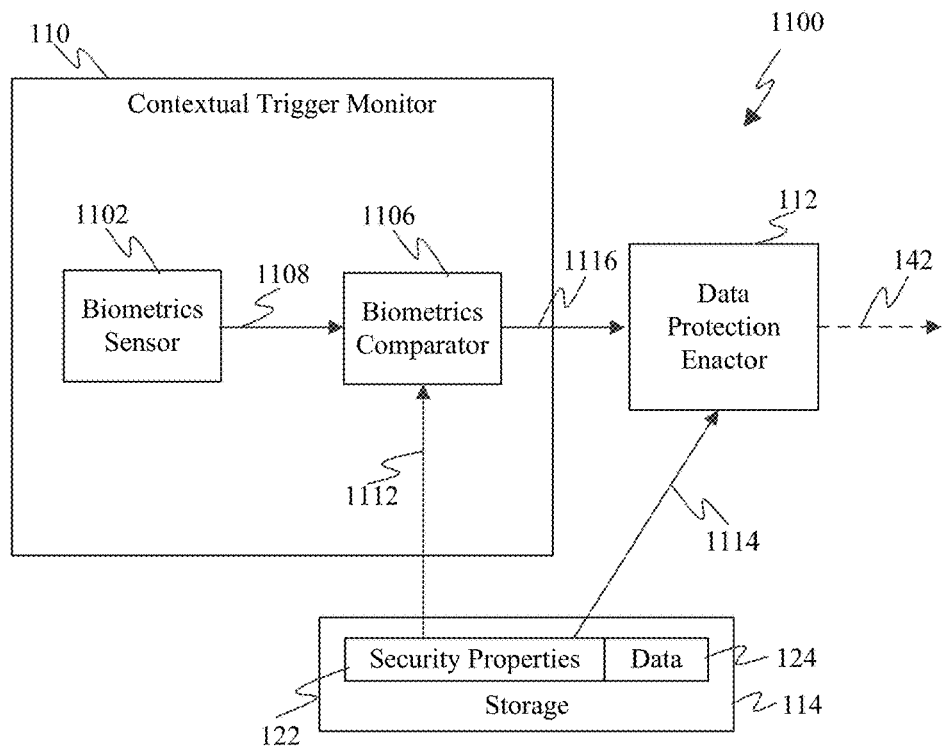
FIG. 11 shows a block diagram of a data protection system configured to use a biometric condition as a contextual trigger for data protection, according to an example embodiment.

IV. Example Embodiments for a Biometric Condition as a Trigger for Data Protection FIG. 11 shows a block diagram of a portion of a data protection system 1100 configured to use a biometric condition as a contextual trigger for data protection, according to an example embodiment. As shown in FIG. 11, data protection system 1100 includes contextual trigger monitor 110 and data protection enactor 112. Furthermore, contextual trigger monitor 110 includes a biometrics sensor 1102 and a biometrics comparator 1106. Although a single biometrics sensor 1102 is shown in FIG. 1, additional biometrics sensors may be present. In an embodiment, contextual trigger monitor 110 may perform step 702 of flowchart 700 (FIG. 7), and data protection enactor 112 may perform step 704 of flowchart 700. Data protection system 1100 is an example of the corresponding portion of data protection system 136 shown in FIG. 1, and for ease of illustration, not all features of system 1100 are necessarily shown in FIG. 11. Data protection system 1100 may be included in computing device 102. Data protection system 1100 is described as follows.

In the embodiment of FIG. 11, contextual trigger monitor 110 is configured to use one or more biometric conditions as a contextual trigger for data protection. In particular, as shown in FIG. 8, biometrics sensor 1102 is configured to monitor one or more biometric conditions of a user associated with computing device 102 (FIG. 1). Any type and number of biometric conditions may be monitored by one or more biometrics sensors 1102, and biometric sensor(s) 1102 may use any suitable biometric condition monitoring techniques, as would be known to persons skilled in the relevant art(s). As shown in FIG. 11, biometrics sensor 1102 generates a biometric condition signal 1108, which indicates one or more values of the one or more biometric conditions.

For instance, in an embodiment, biometrics sensor 1102 may include a heart rate monitor built into the computing device, or located external to the computing device and configured to communicate using a wireless communication signal (e.g., a modulated radio frequency (RF) signal, etc.) with the computing device. Examples of heart rate monitors that may be included in biometrics sensor 1102 include a sensor that uses pulse oximetry, where a sensor of biometrics sensor 1102 contacts the skin of the user (e.g., a fingertip of the user's hand holding the computing device, etc.), and emits light of multiple wavelengths through the skin to a photodetector of biometrics sensor 1102. A changing absorbance of each wavelength is measure, and used to determine absorbance's due to pulsing arterial blood, which may be used to determine the user's heart rate. Additionally or alternatively, the heart rate monitor may include a piezo sensor, or other sensor type, that may be used to monitor the user's heart rate. In the case where biometrics sensor 1102 includes a heart rate monitor, biometric condition signal 1108 may include a value for the heart rate of the user.

In another example embodiment, biometrics sensor 1102 may include a sweat level monitor built into the computing device, or configured to communicate using a wireless communication signal with the computing device. Examples of sweat level monitors that may be included in biometrics sensor 1102 include a moisture sensor in contact with the skin of the user (with a finger or palm of the user's hand holding the computing device, etc.), a humidity sensor, etc. In the case where biometrics sensor 1102 includes a sweat level monitor, biometric condition signal 1108 may include a value for the sweat level of the user.

In another example embodiment, biometrics sensor 1102 may include a temperature monitor built into the computing device, or configured to communicate using a wireless communication signal with the computing device. Examples of temperature monitors that may be included in biometrics sensor 1102 include resistance thermometers, etc. In the case where biometrics sensor 1102 includes a temperature monitor, biometric condition signal 1108 may include a value for the temperature of the user.

In another example embodiment, biometrics sensor 1102 may include a blood pressure monitor built into the computing device, or configured to communicate using a wireless communication signal with the computing device. Examples of blood pressure monitors that may be included in biometrics sensor 1102 include silicon pressure sensors, micro-machined transducers (e.g., MEMS—microelectromechanical systems), etc. In the case where biometrics sensor 1102 includes a blood pressure monitor, biometric condition signal 1108 may include a value for the blood pressure of the user.

As shown in FIG. 11, biometrics comparator 1106 receives biometric condition signal 1108, and receives a contextual trigger biometric condition 1112 from security properties 122 associated with data 124. Biometrics comparator 1106 compares biometric condition signal 1108 to contextual trigger biometric condition 1112, and generates a compare result 1116. Data protection enactor 112 receives compare result 1116, which is an example of trigger notification 126 (FIG. 1). Based on compare result 1116, data protection enactor 112 may enact the data protection response(s) in security properties 122 associated with data 124. As shown in FIG. 11, data protection enactor 112 receives a data protection response 1114 from security properties 122 associated with data 124. Data protection response 1114 indicates the one or more data protection responses to be performed by data protection enactor 112 if compare result 1116 indicates that data protection is to be enacted for data 124.

For example, contextual trigger biometric condition 1112 may indicate an exact value, a threshold value, and/or or a range for a particular biometric condition. If biometric condition signal 1108 has a predetermined relationship with contextual trigger biometric condition 1112 (e.g., equal to, greater than, less than, within the range, outside the range, etc.), compare result 1116 indicates that data 124 may be threatened with unauthorized access, and that data protection response(s) 1114 of security properties 122 therefore are to be performed. If biometric condition signal 1108 does not have the predetermined relationship with contextual trigger biometric condition 1112, the data protection response is not performed.

Some examples of predetermined relationships that can indicate a threat to data of unauthorized access include: a heart rate greater than a predetermined threshold high heart rate value (e.g., a value greater than 100 beats per minute, which may indicate the user is under stress, such as the user being forced to give access to computing device 102, etc.), a heart rate lower than a predetermined threshold low heart rate value (e.g., a value less than 20 beats per minute, which may indicate the user is injured, dying, or dead), a sweat level greater than a predetermined threshold high sweat level value (e.g., a value that is at least 50% greater than a normal sweat level measured for the user, indicating the user is under stress), a sweat level lower than a predetermined threshold low sweat level value (e.g., (e.g., a value that is at least 50% lower than a normal sweat level measured for the user, indicating the user is injured, dying, or dead), a temperature greater than a predetermined threshold high temperature level value (e.g., a value that rapidly increases by at least 0.2% greater than a normal temperature level measured for the user, indicating the user is under stress), a temperature lower than a predetermined threshold low temperature level value (e.g., a value that is at least 0.2% lower than a normal temperature level measured for the user, indicating the user is injured, dying, or dead), a blood pressure greater than a predetermined threshold high blood pressure value (e.g., a value that is at least 10% greater than a normal blood pressure measured for the user, indicating the user is under stress), a blood pressure lower than a predetermined threshold low blood pressure value (e.g., a value that is at least 20% lower than a normal blood pressure level, indicating the user is injured, dying, or dead), etc.

Figure 12:
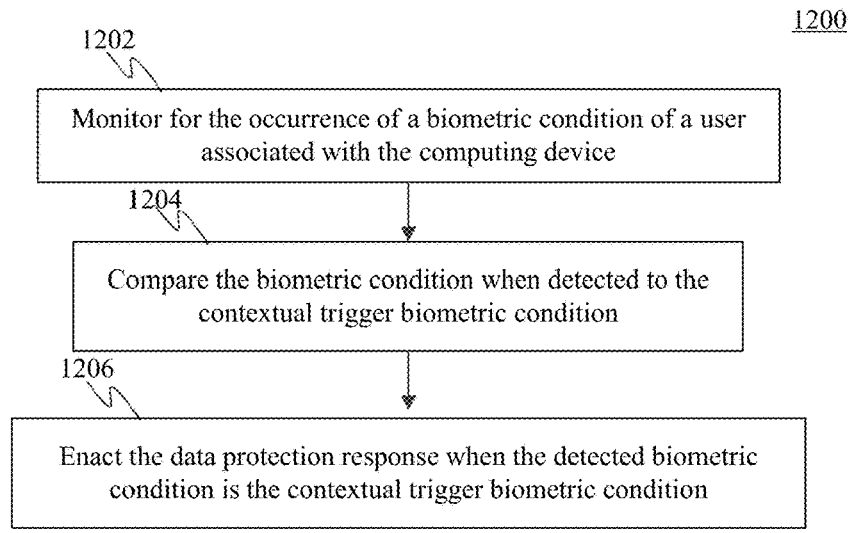
FIG. 12 shows a flowchart providing a process for enacting a data protection response for data based on a biometric condition as a trigger, according to an example embodiment.

Accordingly, data protection system 1100 of FIG. 11 may operate according to FIG. 12. FIG. 12 shows a flowchart 1200 providing a process for enacting a data protection response for data based on a biometric condition, according to an example embodiment. Flowchart 1200 is described as follows with respect to FIG. 11.

Flowchart 1200 begins with step 1202. In step 1202, an occurrence of a biometric condition of a user associated with the computing device is monitored for. For instance, as described above, biometrics sensor 1102 may monitor for an occurrence of one or more biometrics conditions of a user associated with computing device 102. Biometrics sensor 1102 generates a biometric condition signal 1108, which indicates one or more values of the one or more biometric conditions.

In step 1204, when detected, the biometric condition is compared to the contextual trigger biometric condition. For example, as described above with respect to FIG. 11, when biometric condition signal 1108 is received, biometrics comparator 1106 may compare one or more biometric conditions in biometric condition signal 1108 to one or more corresponding biometric condition triggers in contextual trigger biometric information 1112 from security properties 122 associated with data 124.

In step 1206, the data protection response is enacted when the detected biometric condition is the contextual trigger biometric condition. For instance, as described above with respect to FIG. 11, data protection enactor 112 receives compare result 1116. Based on compare result 1116, data protection enactor 112 may enact the data protection response(s) in security properties 122 associated with data 124. As described above, data protection enactor 112 may enact the data protection response(s) when biometric condition signal 1108 has a predetermined relationship with contextual trigger biometric condition 1112.

Figure 13:
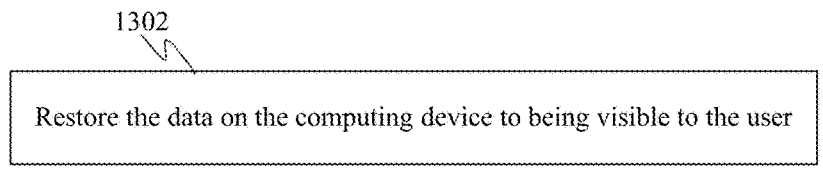
FIG. 13 shows a process for restoring data that was deleted according to a soft delete, according to an example embodiment.

Accordingly, in embodiments, data protections may be triggered for data based on context, such as location, biometric information, etc. Examples of such data protections include soft deletes, hard deletes, alerts, etc. It is noted that if data is soft deleted, the data may be restored once it is determined that the threat of unauthorized data access has diminished or passed. Accordingly, FIG. 13 shows a process for restoring data that was deleted according to a soft delete, according to an example embodiment. In step 1302, the data is restored on the computing device to being visible to the user. In such an embodiment, data that was previously soft deleted or hidden from the user may be restored or recovered. For instance, the links to the data file(s) can be restored from a safe location in storage, etc. The restoration can be automatic, such as a next time that the authorized user logs into computing device 102 with a correct password and correct password entering context. Alternatively, the restoration may be triggered only in a manual fashion, such as by being triggered by password context.

V. Example Mobile and Stationary Device Embodiments

Computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, location determiner 802, location predictor 804, location comparator 806, biometrics sensor 1102, biometrics comparator 1106, flowchart 200, step 302, flowchart 400, step 502, step 602, flowchart 700, flowchart 900, flowchart 1000, flowchart 1200, and step 1302 may be implemented in hardware, or hardware combined with software and/or firmware. For example, user interface module 108, contextual trigger monitor 110, data protection enactor 112, DS selector 116, DPR selector 118, CT selector 120, user interface module 128, DS selector 130, DPR selector 132, CT selector 134, data protection system 136, location determiner 802, location predictor 804, location comparator 806, biometrics comparator 1106, flowchart 200, step 302, flowchart 400, step 502, step 602, flowchart 700, flowchart 900, flowchart 1000, flowchart 1200, and/or step 1302 may be implemented as computer program code/instructions configured to be executed in one or more processors and stored in a computer readable storage medium. Alternatively, computing device 102, server 104, user interface module 108, contextual trigger monitor 110, data protection enactor 112, DS selector 116, DPR selector 118, CT selector 120, user interface module 128, DS selector 130, DPR selector 132, CT selector 134, data protection system 136, location determiner 802, location predictor 804, location comparator 806, biometrics sensor 1102, biometrics comparator 1106, flowchart 200, step 302, flowchart 400, step 502, step 602, flowchart 700, flowchart 900, flowchart 1000, flowchart 1200, and/or step 1302 may be implemented as hardware logic/electrical circuitry.

For instance, in an embodiment, one or more, in any combination, of user interface module 108, contextual trigger monitor 110, data protection enactor 112, DS selector 116, DPR selector 118, CT selector 120, data protection system 136, location determiner 802, location predictor 804, location comparator 806, biometrics sensor 1102, biometrics comparator 1106, flowchart 200, step 302, flowchart 400, step 502, step 602, flowchart 700, flowchart 900, flowchart 1000, flowchart 1200, and/or step 1302 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
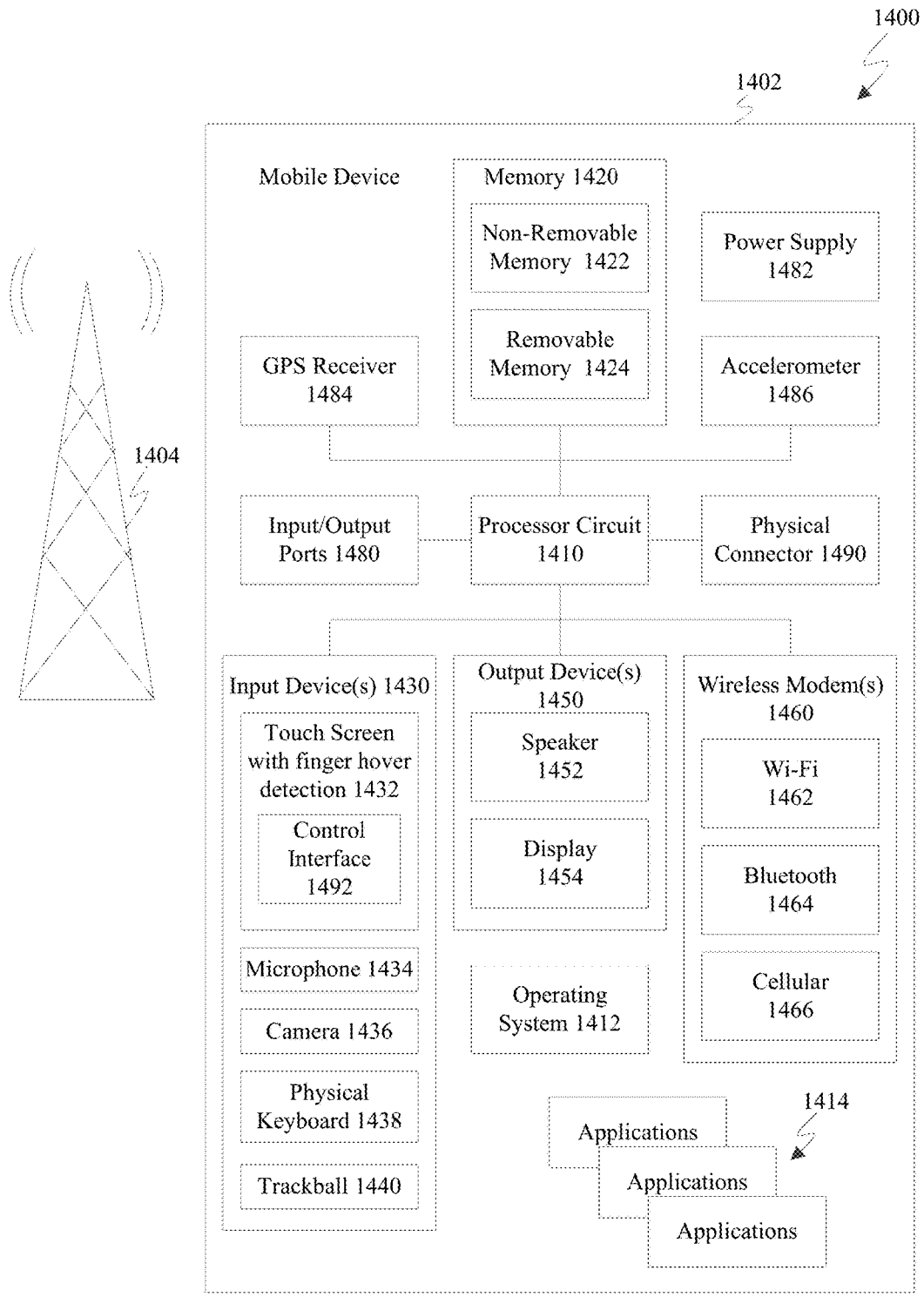
FIG. 14 shows a block diagram of an exemplary user device in which embodiments may be implemented.

FIG. 14 shows a block diagram of an exemplary mobile device 1400 including a variety of optional hardware and software components, shown generally as components 1402. For instance, components 1402 of mobile device 1400 are examples of components that may be included in computing device 102 (FIG. 1) in mobile device embodiments. Any number and combination of the features/elements of components 1402 may be included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor referred to as processor circuit 1410 for performing such tasks as signal coding, image processing, data processing, input/output processing, power control, and/or other functions. Processor circuit 1410 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1410 may execute program code stored in a computer readable medium, such as program code of one or more applications 1414, operating system 1412, any program code stored in memory 1420, etc. Operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, location determiner 802, location predictor 804, location comparator 806, biometrics comparator 1106, flowchart 200, step 302, flowchart 400, step 502, step 602, flowchart 700, flowchart 900, flowchart 1000, flowchart 1200, and step 1302 (including any suitable step of flowcharts 200, 400, 700, 900, 1000, and 1200), and/or further embodiments described herein.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1432 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 1432 is shown to include a control interface 1492 for illustrative purposes. The control interface 1492 is configured to control content associated with a virtual element that is displayed on the touch screen 1432. In an example embodiment, the control interface 1492 is configured to control content that is provided by one or more of applications 1414. For instance, when a user of the mobile device 1400 utilizes an application, the control interface 1492 may be presented to the user on touch screen 1432 to enable the user to access controls that control such content. Presentation of the control interface 1492 may be based on (e.g., triggered by) detection of a motion within a designated distance from the touch screen 1432 or absence of such motion. Example embodiments for causing a control interface (e.g., control interface 1492) to be presented on a touch screen (e.g., touch screen 1432) based on a motion or absence thereof are described in greater detail below.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice control interface that allows a user to operate the device 1400 via voice commands. Further, device 1400 can comprise input devices and software that allows for user interaction via a user's spatial gestures, such as detecting and interpreting gestures to provide input to a gaming application.

Wireless modem(s) 1460 can be coupled to antenna(s) (not shown) and can support two-way communications between processor circuit 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
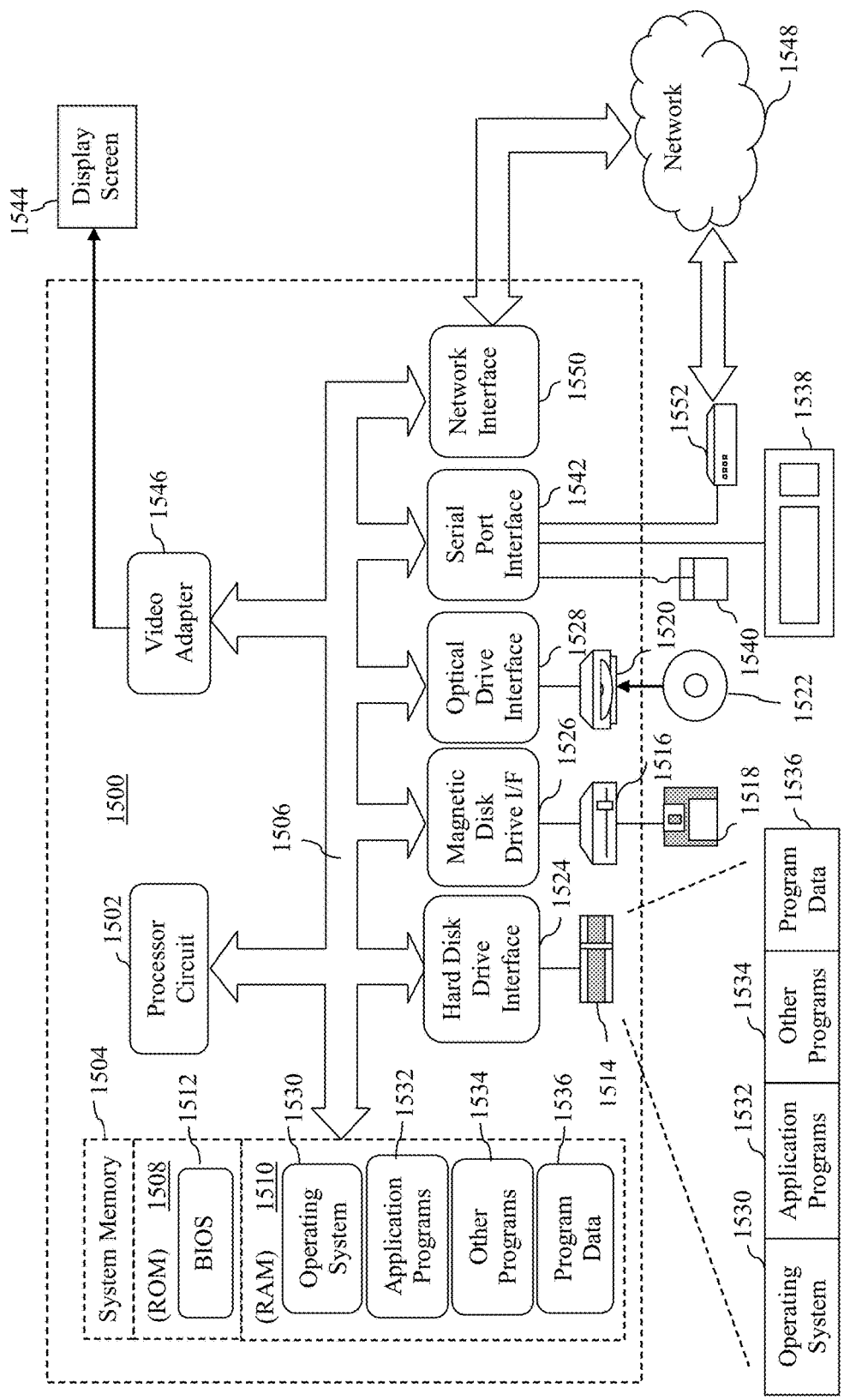
FIG. 15 shows a block diagram of an example computing device that may be used to implement embodiments.

Furthermore, FIG. 15 depicts an exemplary implementation of a computing device 1500 in which embodiments may be implemented. For example, computing device 102 and/or server 104 (FIG. 1) may be implemented in one or more computing devices similar to computing device 1500 in stationary computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing user interface module 108, contextual trigger monitor 110, data protection enactor 112, DS selector 116, DPR selector 118, CT selector 120, user interface module 128, DS selector 130, DPR selector 132, CT selector 134, data protection system 136, location determiner 802, location predictor 804, location comparator 806, biometrics comparator 1106, flowchart 200, step 302, flowchart 400, step 502, step 602, flowchart 700, flowchart 900, flowchart 1000, flowchart 1200, and step 1302 (including any suitable step of flowcharts 200, 400, 700, 900, 1000, and 1200), and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including memory 1420 of FIG. 14). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

VI. Example Embodiments

In one embodiment, a method in a computing device to protect stored data comprises: monitoring for an occurrence of a contextual trigger, the contextual trigger associated with data stored by the computing device, the data having an assigned sensitivity level and having an associated data protection response selected from a plurality of data protection responses that includes a soft delete and a hard delete; and enacting the data protection response associated with the data when the occurrence of the contextual trigger is detected.

In one embodiment of the method, the contextual trigger is a location, and the monitoring comprises: determining a location of the computing device; and comparing the determined location of the computing device to the contextual trigger location. The enacting comprises: enacting the data protection response when the determined location of the computing device is the contextual trigger location.

In an alternative embodiment of the method, the contextual trigger is a location, and the monitoring comprises: predicting a future location of the computing device; and comparing the predicted future location of the computing device to the contextual trigger location. The enacting comprises: enacting the data protection response when the predicted future location of the computing device is the contextual trigger location.

In the method, the contextual trigger may be a biometric condition of a user associated with the computing device.

In the method, the monitoring for an occurrence of a contextual trigger may comprise: monitoring for at least one of: a heart rate greater than a predetermined threshold high heart rate value; a heart rate lower than a predetermined threshold low heart rate value; a sweat level greater than a predetermined threshold high sweat level value; a sweat level lower than a predetermined threshold low sweat level value; a temperature greater than a predetermined threshold high temperature level value; a temperature lower than a predetermined threshold low temperature level value; a blood pressure greater than a predetermined threshold high blood pressure value; or a blood pressure lower than a predetermined threshold low blood pressure value.

In the method, the data protection response may be the soft delete, and the enacting the data protection response associated with the data when the contextual trigger is detected may comprise: concealing the data on the computing device from view by a user.

The method may further comprise: restoring the data on the computing device to being visible to the user.

The method may further comprise: providing a user interface that enables the data sensitivity level, the contextual trigger, and the data protection response to be assigned to the data.

In the method, the providing a user interface that enables the data sensitivity level, the contextual trigger, and the data protection response to be assigned to the data may comprise: enabling the data protection response to be at least one of broadcasting an alert, disabling a file from being able to be opened, closing an open data display window, or hiding an open data display window behind at least one other window.

In another embodiment, a method in a server comprises: providing a user interface that enables a data sensitivity level to be assigned to data stored on a computing device that is separate from the server; enabling a data protection response to be selected through the user interface to be associated with the data, the data protection response enabled to be selected from a plurality of data protection responses that includes a soft delete and a hard delete; and enabling a contextual trigger to be assigned to the data through the user interface, the data protection response enacted to protect the data when an occurrence of the contextual trigger is detected.

In the method, the enabling a data protection response to be selected through the user interface to be associated with the data comprises: enabling the data protection response to be selected to be at least one of broadcasting an alert, disabling a file from being able to be opened, closing an open data display window, or hiding an open data display window behind at least one other window.

In the method, the enabling a contextual trigger to be assigned to the data through the user interface comprises: enabling a location to be assigned to the data, the data protection response enacted to protect the data when the computing device is detected at the location.

In the method, the enabling a contextual trigger to be assigned to the data through the user interface comprises: enabling a location to be assigned to the data, the data protection response enacted to protect the data when the computing device is predicted to be at the location in the future.

In the method, the enabling a contextual trigger to be assigned to the data through the user interface comprises: enabling a biometric condition of a user associated with the computing device to be assigned to the data.

In still another embodiment, a system in a computing device to protect stored data comprises a user interface module, a contextual trigger monitor, and a data protection enactor. The user interface module enables a data sensitivity level, a data protection response, and a contextual trigger to be associated with data stored on the computing device, the user interface configured to enable the data protection response to be selected from a plurality of data protection responses that includes a soft delete and a hard delete. The contextual trigger monitor is configured to monitor for an occurrence of the contextual trigger. The data protection enactor is configured to enact the data protection response associated with the data when an occurrence of the contextual trigger is detected.

In an embodiment of the system, the contextual trigger is a location, and the contextual trigger monitor comprises: a location determiner configured to determine a location of the computing device; and a location comparator configured to compare the determined location of the computing device to the contextual trigger location. The data protection enactor is configured to enact the data protection response when the determined location of the computing device is the contextual trigger location.

In an embodiment of the system, the contextual trigger is a location, and the contextual trigger monitor comprises: a location predictor configured to predict a future location of the computing device; and a location comparator configured to compare the predicted future location of the computing device to the contextual trigger location. The data protection enactor is configured to enact the data protection response when the predicted future location of the computing device is the contextual trigger location.

In an embodiment of the system, the contextual trigger is a biometric condition of a user associated with the computing device.

In an embodiment of the system, the data protection response is the soft delete, and the data protection enactor is configured to conceal the data on the computing device from view by a user.

In an embodiment of the system, the data protection enactor is configured to restore the data on the computing device to being visible to the user.

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
storing data in a storage device of the computing device, the stored data stored with assigned parameters including sensitivity level, an associated data protection response selected from a plurality of data protection responses that includes a soft delete and a hard delete, and a contextual trigger configured to cause the assigned data protection response to be enacted;
subsequent to said storing, monitoring for an occurrence of the assigned contextual trigger;
comparing the occurred contextual trigger to the assigned contextual trigger to determine a match; and
enacting the data protection response associated with the data in response to the determined match.

2. The method of claim 1, wherein the contextual trigger is a location, said monitoring comprises:
determining a location of the computing device;
said comparing comprises:
comparing the determined location of the computing device to the contextual trigger location; and
said enacting comprises:
enacting the data protection response when the determined location of the computing device is the contextual trigger location.

3. A method in a computing device to protect stored data, comprising:
monitoring for an occurrence of a contextual trigger, the contextual trigger being a location associated with data stored by the computing device, the data having an assigned sensitivity level and having an associated data protection response selected from a plurality of data protection responses that includes a soft delete and a hard delete, the monitoring comprising predicting a future location of the computing device and comparing the predicted future location of the computing device to the contextual trigger location; and
enacting the data protection response associated with the data when the occurrence of the contextual trigger is detected, the enacting comprising enacting the data protection response when the predicted future location of the computing device is the contextual trigger location.

4. The method of claim 1, wherein the contextual trigger is a biometric condition of a user associated with the computing device.

5. The method of claim 4, wherein said monitoring for an occurrence of the assigned contextual trigger comprises: monitoring for at least one of:
- a heart rate greater than a predetermined threshold high heart rate value;
- a heart rate lower than a predetermined threshold low heart rate value;
- a sweat level greater than a predetermined threshold high sweat level value;
- a sweat level lower than a predetermined threshold low sweat level value;
- a temperature greater than a predetermined threshold high temperature level value;
- a temperature lower than a predetermined threshold low temperature level value;
- a blood pressure greater than a predetermined threshold high blood pressure value; or
- a blood pressure lower than a predetermined threshold low blood pressure value.

6. The method of claim 1, wherein the data protection response is the soft delete, and said enacting the data protection response associated with the data in response to the determined match comprises:
concealing the data on the computing device from view by a user.

7. The method of claim 6, further comprising:
restoring the data on the computing device to being visible to the user.

8. The method of claim 1, further comprising:
providing a user interface that enables the data sensitivity level, the contextual trigger, and the associated data protection response to be assigned to the data.

9. The method of claim 8, wherein said providing a user interface that enables the data sensitivity level, the contextual trigger, and the assigned data protection response to be assigned to the data comprises:
enabling the data protection response to be at least one of
- broadcasting an alert,
- disabling a file from being able to be opened,
- closing an open data display window, or
- hiding an open data display window behind at least one other window.

10. A method in a server, comprising:
providing a user interface that enables a data sensitivity level to be assigned to data stored in a storage device on a computing device that is separate from the server;
enabling a data protection response to be selected through the user interface to be associated with the stored data, the data protection response selected from a plurality of data protection responses that includes a soft delete and a hard delete, the stored data stored in the storage device with assigned parameters including the sensitivity level, the associated data protection response, and a contextual trigger configured to cause the assigned data protection response to be enacted; and
enabling the contextual trigger to be assigned to the stored data through the user interface, the data protection response enacted to protect the stored data in response to detecting an occurrence of the assigned contextual trigger and determining a match of the occurred contextual trigger and the assigned contextual trigger.

11. The method of claim 10, wherein said enabling a data protection response to be selected through the user interface to be associated with the stored data comprises:
enabling the data protection response to be selected to be at least one of
- broadcasting an alert,
- disabling a file from being able to be opened,
- closing an open data display window, or
- hiding an open data display window behind at least one other window.

12. The method of claim 10, wherein said enabling a contextual trigger to be assigned to the stored data through the user interface comprises:
enabling a location to be assigned to the data, the data protection response enacted to protect the data when the computing device is detected at the location.

13. A method in a server, comprising:
providing a user interface that enables a data sensitivity level to be assigned to data stored on a computing device that is separate from the server;
enabling a data protection response to be selected through the user interface to be associated with the data, the data protection response enabled to be selected from a plurality of data protection responses that includes a soft delete and a hard delete; and
enabling a contextual trigger to be assigned to the data through the user interface, the data protection response enacted to protect the data when an occurrence of the contextual trigger is detected, the enabling a contextual trigger to be assigned to the data through the user interface comprising enabling a location to be assigned to the data, the data protection response enacted to protect the data when the computing device is predicted to be at the location in the future.

14. The method of claim 10, wherein said enabling the contextual trigger to be assigned to the stored data through the user interface comprises:
enabling a biometric condition of a user associated with the computing device to be assigned to the data.

15. A system in a computing device, comprising:
a user interface module that enables a data sensitivity level, a data protection response, and a contextual trigger to be associated with data stored on the computing device, the stored data stored with assigned parameters including a sensitivity level, an associated data protection response selected from a plurality of data protection responses that includes a soft delete and a hard delete, and a contextual trigger configured to cause the assigned data protection response to be enacted;
a contextual trigger monitor configured to monitor, subsequent to the stored data being stored, for an occurrence of the assigned contextual trigger; and
a data protection enactor configured to enact the data protection response associated with the data in response to a determined match of the occurred contextual trigger and the assigned contextual trigger.

16. The system of claim 15, wherein the contextual trigger is a location, the contextual trigger monitor comprises:
a location determiner configured to determine a location of the computing device; and
a location comparator configured to compare the determined location of the computing device to the contextual trigger location; and
the data protection enactor is configured to enact the data protection response when the determined location of the computing device is the contextual trigger location.

17. A system in a computing device to protect stored data, comprising:

a user interface module that enables a data sensitivity level, a data protection response, and a contextual trigger to be associated with data stored on the computing device, the user interface configured to enable the data protection response to be selected from a plurality of data protection responses that includes a soft delete and a hard delete;

a contextual trigger monitor configured to monitor, subsequent to the data being stored, for an occurrence of the contextual trigger, the contextual trigger being a location, the contextual trigger monitor comprising:

a location predictor configured to predict a future location of the computing device; and a location comparator configured to compare the predicted future location of the computing device to the contextual trigger location; and a data protection enactor configured to enact the data protection response associated with the data when an occurrence of the contextual trigger is detected, the data protection enactor configured to enact the data protection response when the predicted future location of the computing device is the contextual trigger location.

18. The system of claim 15, wherein the contextual trigger is a biometric condition of a user associated with the computing device.

19. The system of claim 15, wherein the data protection response is the soft delete; and the data protection enactor is configured to conceal the data on the computing device from view by a user.

20. The system of claim 19, wherein the data protection enactor is configured to restore the data on the computing device to being visible to the user.

* * * * *